United States Patent [19]
Sakurai

[11] 3,811,107
[45] May 14, 1974

[54] FLASHING DIRECTION INDICATOR
[75] Inventor: Yasuhiko Sakurai, Kariya, Japan
[73] Assignee: Nippondenso Co., Ltd., Aichi-ken, Japan
[22] Filed: Nov. 9, 1971
[21] Appl. No.: 196,928

[30] Foreign Application Priority Data
Nov. 11, 1970 Japan............................ 45-111732
July 1, 1971 Japan............................ 46-57129

[52] U.S. Cl................. 340/80, 340/81 F, 340/251
[51] Int. Cl............................................... B60q 1/38
[58] Field of Search ........... 340/80, 81 R, 81 F, 251

[56] References Cited
UNITED STATES PATENTS
3,487,358  12/1969  Ubukata et al..................... 340/81 F
3,508,237  4/1970   Kimmelman........................ 340/251
3,618,011  11/1971  Leeder................................. 340/80
FOREIGN PATENTS OR APPLICATIONS
1,810,236  6/1970   Germany............................. 340/80

OTHER PUBLICATIONS
German printed application 1,810,236, 6-1970, Robert Bosch GmbH.

Primary Examiner—John W. Caldwell
Assistant Examiner—Kenneth N. Leimer
Attorney, Agent, or Firm—Cushman, Darby & Cushman

[57] ABSTRACT

A flashing direction indicating apparatus wherein a plurality of turn signal lamps are intermittently coupled to power by a driving circuit through the closure of a normally open contact thereof. A current coil is coupled in series with the turn signal lamps, and a voltage coil is wound in opposite phase and coupled in parallel therewith. A normally closed contact is coupled to power and direction indicator lamps and is driven by the combined magnetomotive force of the coils, the coils are so wound that the normally closed contact remains closed when the current flowing through the corresponding coil decreases below a predetermined value thereby indicating a circuit malfunction.

2 Claims, 10 Drawing Figures

TURN SIGNAL LAMPS

TURN SIGNAL LAMPS

FLASHING DIRECTION INDICATOR

FIELD OF THE INVENTION

This invention relates to an improved flashing direction indicating apparatus mounted on an automobile or the like.

DESCRIPTION OF THE PRIOR ART

The conventional flashing direction indicating apparatus take several forms including a capacitor type in which a relay is energized by charging and discharging a capacitor, a mercury type in which mercury is used as an electric interrupting element, delaying the interruption by means of delayed motion of mercury and an electromagnetic heating wire type in which both expansion of a heating wire and interruptions of a relay are utilized, to mention a few. These flashing direction indicating apparatus are of such construction that reduction in load current due to the disconnection of a turn signal lamp is detected to indicate to the driver its breakdown.

Referring to FIG. 1 which shows a well known conventional flashing direction indicating apparatus, the reference numeral 1 shows a battery, numeral 2 a power switch, numeral 3 a flashing device, numeral 4 a turn signal switch, numerals 5a, 5b, 8a and 8b left and right turn signal lamps respectively, and numerals 9 and 10 left and right direction indicator lamps respectively which are provided inside the automobile. The flashing device 3 is an example of the capacitor type, which is composed of a normally-closed contact 11, current coil 12, voltage coil 13 and capacitor 14. Assume that the power switch 2 is closed and the turn signal switch 4 is closed to the left. The turn signal lamps 5a and 5b and the direction indicator lamp 9 flash in synchronism with each other due to the interruptions of the normally-closed contact 11 of the flashing device 3. When the turn signal lamp 5a is disconnected, the load current in the current coil of the flashing device is reduced, making it impossible to open the normally-closed contact 11, with the result that the remaining turn signal lamp 5b and direction indicator lamp 9 are kept turned on. The sustained state of lighting of the direction indicator lamp 9 informs the driver that at least one of the turn signal lamps 5a and 5b is disconnected. In this case, when one of the turn signal lamps 5a and 5b is disconnected, the other turn signal lamps are left turned on without any flashing operation. This constitutes a great disadvantage in protecting safely since it is impossible to know exactly from outside the automobile whether it is turning or not.

Accordingly, it is an object of the invention to obviate the above-mentioned disadvantage of the conventional apparatus by providing a highly safe direction indicating apparatus in which the circuit of the turn signal lamps is separated from that of the direction indicator lamp so that even when a turn signal lamp is disconnected, the remaining turn signal lamps accurately perform flashing operations as under normal conditions, whereby not only the turning of the automobile is positively indicated to outside automobiles and people but the sustained lighting of the turn indicator lamp informs the driver of the disconnection of the turn signal lamp with certainty.

Another object of the invention is to greatly improve the disconnection detecting ability by combined use of a current coil and a voltage coil which generates a small magnetomotive force of an inverted phase in a disconnection detecting relay circuit.

Still another object of the invention is to provide a direction indicating apparatus employing not only ordinary turn signal lamps but a small-capacity turn signal lamp, in which the disconnection of a turn signal lamp is successfully detected and the switching circuit therefor is simply constructed.

According to the invention, an interrupted operating means whose frequency of interruptions is not affected by any variation in load current and a parallel-connected normally-open contact which is opened and closed by the interrupted operating means are inserted between a power supply and a group of turn signal lamps. Also, the turn signal lamps are connected in series with a current coil, and a voltage coil wound in the phase opposite to that of the current coil is provided. A contact which is driven by the combined magnetomotive force of the current and voltage coils is connected in series with a direction indicator lamp circuit inside the automobile which is independent of the circuit of the turn signal lamps, so that when a part of the plurality of turn signal lamps is disconnected, the direction indicator lamp is kept turned on or off, informing the driver of the disconnection. Further, the remaining working turn signal lamps flash normally, fulfilling their function to indicate the direction and thus securing greater safety in driving the automobile.

Further, as a disconnection detecting relay circuit for the apparatus of the invention, a current coil is used in combination with a voltage coil which is wound in the phase opposite to that of the current coil and which generates smaller magnetomotive force than the current coil, so that the voltage coil successfully compensates for variation in magnetomotive force due to variation in voltage of the current coil, holding at a low level the changes in combined magnetomotive force due to the variation in power voltage. This greatly improves the ability to detect a disconnection, enabling detection of a disconnection of even one lamp among the three or disconnection of a small-capacity turn signal lamp.

In addition, according to the flashing direction indicating apparatus according to the invention employing both large-capacity and small-capacity turn signals lamps, the disconnection of the small-capacity turn signal lamps is detected by a circuit arrangement which consists of the small-capacity right and left turn signal lamps are connected in series with current coils respectively and a group of the large-capacity turn signal lamps connected in parallel with the series circuit, the parallel circuit being inserted at the turn signal lamp side of the turn signal switch. Therefore, the turn signal switch may include only two circuits for direction indication and flash indication respectively, simplifying the switch construction. Especially, this permits simplification of a hazard warning signal switch used in a combined danger indication flashing apparatus and direction indicating apparatus.

SUMMARY OF THE INVENTION

Figure 1:
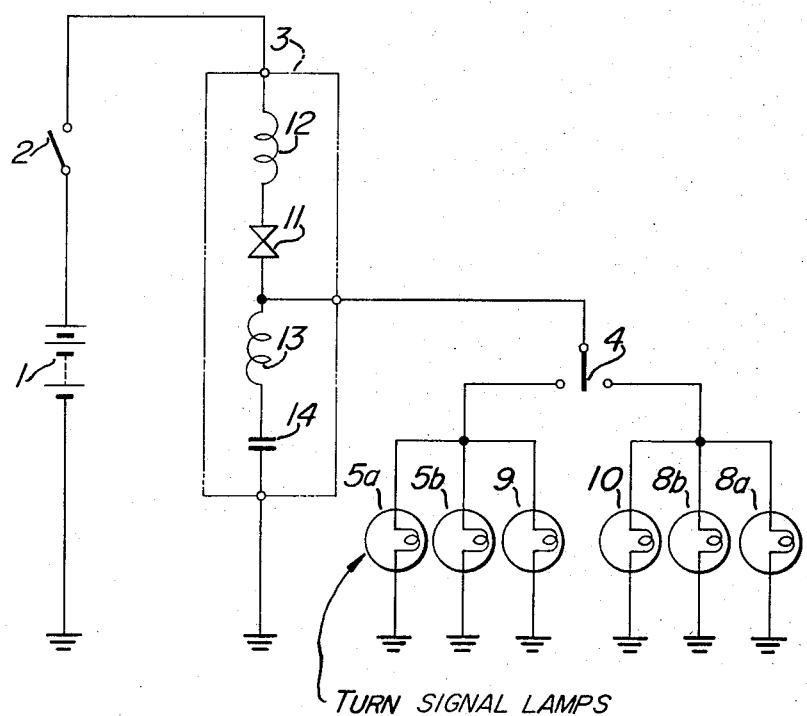
FIG. 1 is a diagram showing an electrical circuit of a well-known conventional flashing direction indicating apparatus.

A flashing direction indicating apparatus wherein a plurality of turn signal lamps are intermittently coupled to power by a driving circuit through the closure of a normally open contact thereof. A current coil is coupled in series with the turn signal lamps, and a voltage coil is wound in opposite phase and coupled in parallel therewith. A normally closed contact is coupled to power and direction indicator lamps and is driven by the combined magnetomotive force of the coils, the coils are so wound that the normally closed contact remains closed when the current flowing through the corresponding coil decreases below a predetermined value thereby indicating a circuit malfunction.

For a better understanding of the present invention, together with other and further objects thereof, reference is directed to the following description, taken in connection with the accompanying drawings, while its scope will be pointed out in the appended claims.

DESCRIPTION OF THE PREFERRED EMBODIMENTS

An embodiment of the present invention will be now explained with reference to FIG. 2. The reference numeral 1 shows a vehicle-mounted battery or a power supply, numeral 2 a power switch, numeral 3a a flashing device according to the present invention, and numerals 4a and 4b switches interlocked with each other which constitute a turn signal switch 4. Numerals 5a, 5b, 5c; 8a, 8b and 8c show left and right turn signal lamps respectively, the lamps 5a, 5b, 8a and 8b being attached to the rear of the automobile, the lamps 5c and 8c being provided on the front thereof. Numerals 9 and 10 show left and right turn signal lamps respectively which are arranged on the control panel in the automobile. The left and right turn signal lamps 9 and 10 constitute a circuit independent of the left and right turn signal lamps 5a, 5b, 5c, 8a, 8b and 8c. The flashing device 3a comprises an interrupting switch including the movable contact 16 and fixed contact 16a, a driving section 15 for driving the movable contact 16 at regular intervals, a current coil 18 in series with the turn signal lamps 5a, 5b, 5c, 8a, 8b and 8c, a voltage coil 19 wound in opposite phase on the current coil 18 for generating a small magnetomotive force, and a normally-closed contact 17 driven by the combined magnetomotive force of the coils 18 and 19. The current coil 18, voltage coil 19 and normally-closed contact 17 constitute a disconnection detecting relay circuit. The driving section 15 is of such a type that the frequency of its interruptions is not affected by the load current and this configuration is also possible with the conventional apparatus of the capacitor, mercury, heating wire or electromagnetic heating wire type, an example of which is shown in FIG. 3. The apparatus of FIG. 3 is of the capacitor type which is made up of a pair of voltage coils 15a and 15b and capacitor 15c. The resistance value of the voltage coils 15a and 15b are set at a level much greater than that of the turn signal lamps.

The operation of the apparatus according to the invention with the above-described construction will be now explained. When the power switch 2 is closed and the turn signal switch 4 closed to the left turning side, current flows through the power switch 4, an intermittent driving section 15, current coil 18, turn signal switch 4b, and through the left-turn signal lamps 5a, 5b and 5c, whereby the intermittent driving section 15 is fed to drive the movable contact 16 at regular intervals. The resistance value of the driving section 15 is set sufficiently high compared with that of the turn signal lamps 5a, 5b and 5c and therefore, when the movable contact 16 is disconnected with the fixed contact 16a, most of the source voltage is applied across the driving section 15, preventing the turn signal lamps 5a, 5b and 5c from being turned on. On the other hand, the magnetomotive force of the current coil 18 is reduced to almost zero, keeping the normally-closed contact 17 closed, so that the direction indicator lamp 9 is turned on through the turn signal switch 4. When the movable contact 16 is driven by the driving section 15 to be closed with the fixed contact 16a, the left-turn signal lamps 5a, 5b and 5c are turned on, while at the same time opening the normally-open contact 17 due to the combined magnetomotive force of the current coil 18 and the voltage coil 19 of opposite phases, thus turning off the direction indicator lamp 9. Ths operation is repeated to flash the left-turn signal lamps 5a, 5b and 5c, indicating that the automobile is turning left. At the same time, the lamp 9 flashes, to indicate to the driver the turning of the automobile in the left direction. Similar operations result when the direction indicator switch 4 is closed to the right-turning side. As can be seen from the above description, when the turn signal lamps flash normally with the operation of the flashing device 3a, the direction indicator lamp 9 or 10 flashes inversely from the turn signal lamps to indicate the flashing operation to the driver.

Assuming that disconnection of the left-turn signal lamp 5a, 5b or 5c reduces the load current, the combined magnetomotive force of the current coil 18 and the voltage coil 19 is also reduced, which prevents the normally-closed contact 17 opening when the remaining turn signal lamps operate normally, causing the indicator lamp 9 to be turned on. Also, when the remaining lamps are turned off among the turn signal lamps 5a, 5b and 5c, the normally-closed contact 17 is closed, causing the indicator lamp 9 to be turned on. As a result, the indicator lamp 9 is kept turned on, informing the driver of the occurrence of disconnection of the left-turn signal lamp. The remaining normal turn signal lamps among the lamps 5a, 5b and 5c continue flashing and fulfils its function to indicate the turning direction, by dint of the operation of the voltage-type intermittent driving section 15 which is not affected by variation in load current.

When all of the left-turning signal lamps 5a, 5b and 5c become inoperative, the interrupted driving section 15 is fed only through the voltage coil 19. But since the resistance value of the voltage coil 19 is set at a very high level, very little power is supplied to the driving section 15, with the result that the movable contact 16 stops the intermittent operation, maintaining the fixed contact 16a in an open state. Under this condition, the magnetomotive force of the current coil 18 is reduced to zero, making the magnetomotive force in the voltage coil 19 only insufficient to attract the normally-closed contact 17. Thus, the normally-closed contact 17 is kept closed and the direction indicator lamp 9 is kept turned on, indicating the breakdown. The breakdown can be indicated also by employing a normally-open contact in place of the normally-closed contact 17, in which case the indicator lamp 9 or 10 is kept turned off by the disconnection.

As will be understood from the above explanation of the operation of the apparatus according to the invention, it is provided with the voltage coil 19 for generating a small magnetomotive force in the disconnection detecting relay circuit, whereby the ability to detect a disconnection is greatly improved.

Figure 4:
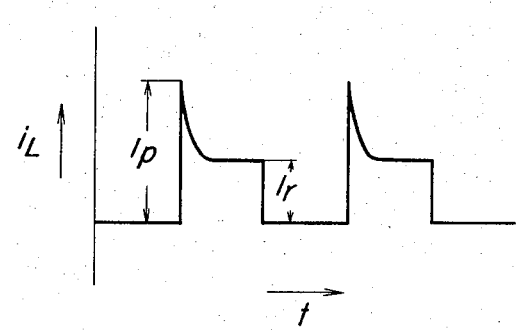
FIG. 4 is a diagram of a current waveform showing chronological variation in current while incandescent lamps which are a load of the flashing direction indicating apparatus are being flashed.

Explanation will be made now of the disconnection detecting ability of the apparatus according to the present invention. First, a current waveform of the lamps flashing by the flashing direction indicating apparatus is shown in FIG. 4, in which the ordinate shows the load current $I_L$ of the lamps and the abscissa time $t$. It is apparent from this figure that at the initial stage of lighting, the load current $I_L$ is accompanied by a rush current $I_p$ which reaches the steady current level $I_r$ with the lapse of time $t$. For this reason, greatly different disconnection detecting means results, depending upon whether detection of a disconnection is effected by means of the rush current $I_p$ or by the steady current $I_r$.

Figure 2:
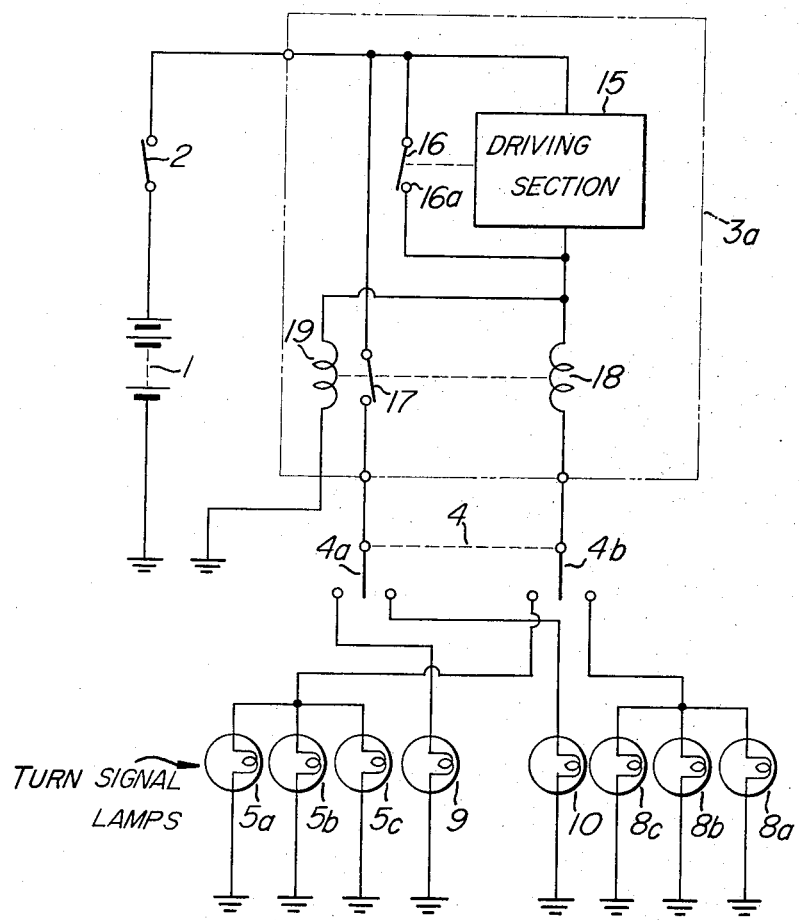
FIG. 2 is an electrical circuit diagram showing an embodiment of the flashing direction indicating apparatus according to the present invention.
Figure 3:
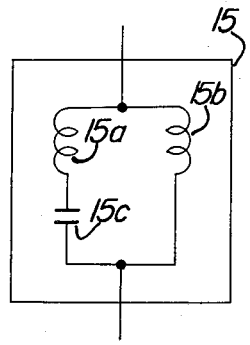
FIG. 3 is an electrical circuit diagram showing an example of the component elements constituting a flashing device of the embodiment of FIG. 2.

The apparatus according to the invention, as shown in the configuration of FIG. 2, is such that the normally-closed contact 17 is attracted to an open state by the combined magnetomotive force of the current coil 18 and voltage coil 19 in the initial lighting stage of the turn signal lamps, so that disconnection is detected by means of the surge current $I_p$.

Figure 5:
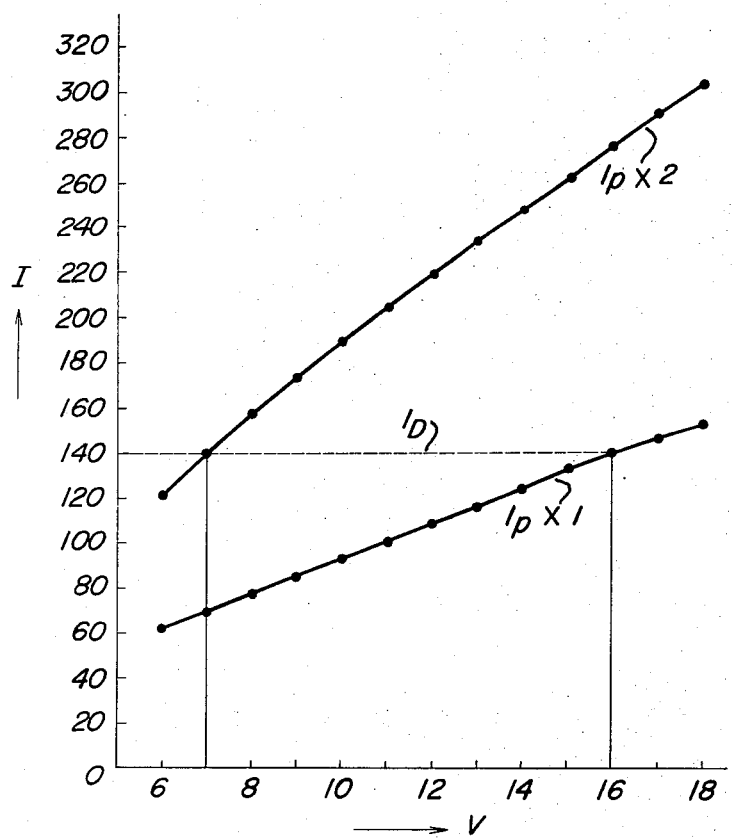
FIG. 5 is a characteristics diagram for explaining the disconnection detecting ability of the conventional apparatus.

Explanation will be made now of the functions to detect the disconnection by means of the surge current $I_p$ with reference to FIG. 5. The ordinate shows the load current $I$ of the turn signal lamp, and the abscissa the source voltage V. Let us consider an ordinary circuit configuration employing only the current coil 18 without using the voltage coil 19 in a disconnection detecting relay circuit. Assuming that the detection level is set at $I_D$, the disconnection can be detected in the voltage range from 7 to 16 volts. This shows that this method is applicable to the detection of disconnection of at the most one out of the two lamps, that is to say, it has only 50 percent of the disconnection detecting ability considering great variation in the source voltage of an automobile.

Figure 6:
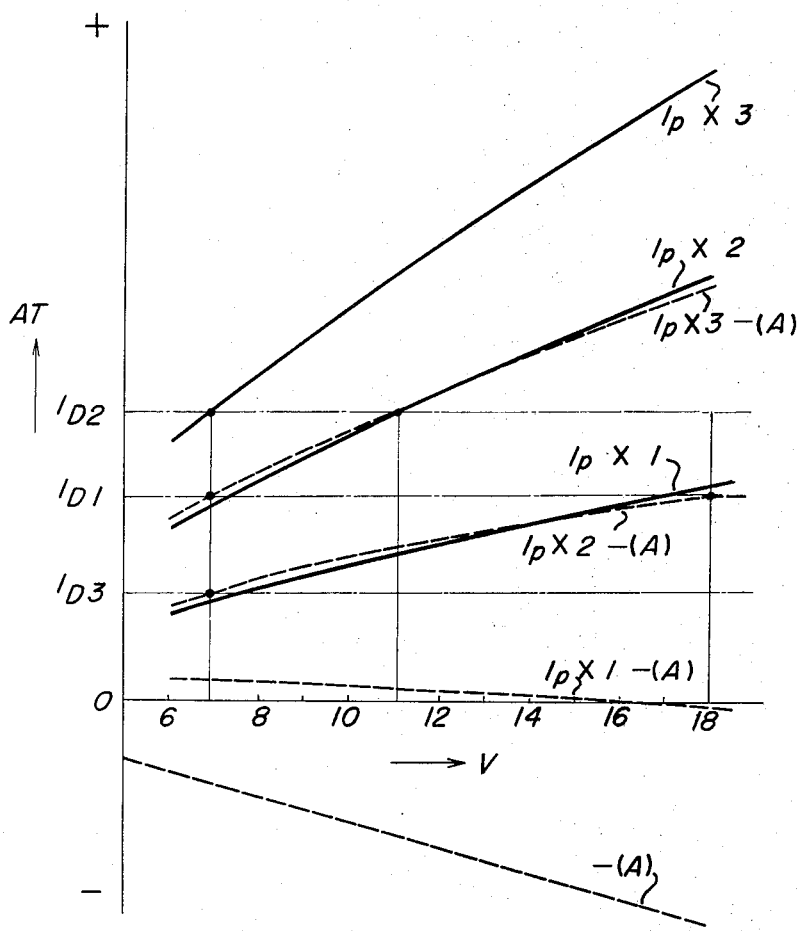
FIG. 6 is a characteristics diagram for explaining the disconnection detecting ability of the apparatus according to the present invention.

A characteristics diagram showing the ability of the apparatus according to the invention to detect disconnections is illustrated in FIG. 6, where the ordinate shows the combined magnetomotive force AT of the current coil 18 and voltage coil 19 and the abscissa the source voltage V. In this figure, the symbol $-A$ shows the magnetomotive force of the inverted phase generated by the voltage coil 19. The solid lines $I_p \times 1$, $I_p \times 2$ and $I_p \times 3$ show the magnetomotive force generated in the presence of only the current coil 18 when 1, 2 and 3 turn signal lamps are turned on respectively. The dashed lines $I_p \times 1 - (A)$, $I_p \times 2 - (A)$ and $I_p \times 3 - (A)$ show combined magnetomotive force of the current coil 18 and voltage coil 19 when 1, 2 and 3 turn signal lamps are turned on respectively. Assuming that the level of detection of disconnection one of the three lamps is set at $I_{D1}$, the disconnection can be detected in the range from 7 to 18 volts, making it possible to positively detect the disconnection of one out of the three lamps even allowing for the variation in the source voltage of the automobile. In the conventional circuit configuration employing only the current coil 18, by contrast, setting the level of detection of disconnection of one lamp at $I_{D2}$ limits the detection range to between 7 to 11.3 volts, making it difficult to use the apparatus for practical purposes. This means that it is the disconnection of at most one lamp that the conventional apparatus is able to successfully detect. According to the present invention, the detection of disconnection of one out of the two lamps can be effected at any source voltage of 7 volts or higher, if the detection level is set at $I_{D3}$.

It will be understood from the above description that the ability to detect a disconnection is greatly improved according to the invention. The function of the voltage coil 19 which plays an important role in the improved ability to detect the lamp disconnection will be now described. As already explained, the current coil 18 and the voltage coil 19 are arranged electromagnetically opposite in phase, and the magnetomotive force of the voltage coil 19 is set at a smaller level than that of the current coil 18, or usually at one third or one fourth the magnetomotive force which is generated by the load current flowing in the current coil 18 when all the turn signal lamps are turned on. The reason why the use of the voltage coil 19 in combination with the current coil 18 improves the ability to detect disconnections is that the variation in magnetomotive force in the current coil 18 which is caused by the variation in voltage is successfully compensated for by the magnetomotive force of the voltage coil 19, thereby minimizing the variation in the combined magnetomotive force of the coils 18 and 19. The current in the current coil 18 depends on the characteristics of the turn signal lamps. But the current in a lamp and hence the current in the current coil 18 changes in proportion to the 0.5th to 0.6th power of the source voltage. On the other hand, since the voltage coil 19 is connected with the power supply 1 without any lamp load between them, the current in the voltage coil 19 changes in direct proportion to the variation in the source voltage, namely, in proportion to the first power of the source voltage. Therefore, the current in the voltage coil 19 undergoes a greater change than that in the current coil 18 as against the variation in source voltage.

Consequently, in the low range of source voltage, the magnetomotive force generated in the voltage coil 19 is reduced at a higher rate than that generated in the current coil 18. As a result, demagnetization due to the voltage coil 19 is less than under the normal conditions, so that the combined magnetomotive force of the coils 18 and 19 decreases only a little. In the higher range of the source voltage, by contrast, the magnetomotive force generated in the voltage coil 19 increases at a higher rate than that generated in the current coil 18, with the result that magnetization due to the voltage coil 19 becomes higher than under normal conditions, so that the combined magnetomotive force of the coils 18 and 19 increases only a little. In this way, the variation in magnetomotive force in the current coil 18 is successfully compensated for, maintaining a small variation in the combined magnetomotive force of the coils 18 and 19 caused by the variations in voltage. This makes it possible to positively detect cases of disconnection over a wide range of the source voltage.

Figure 7:
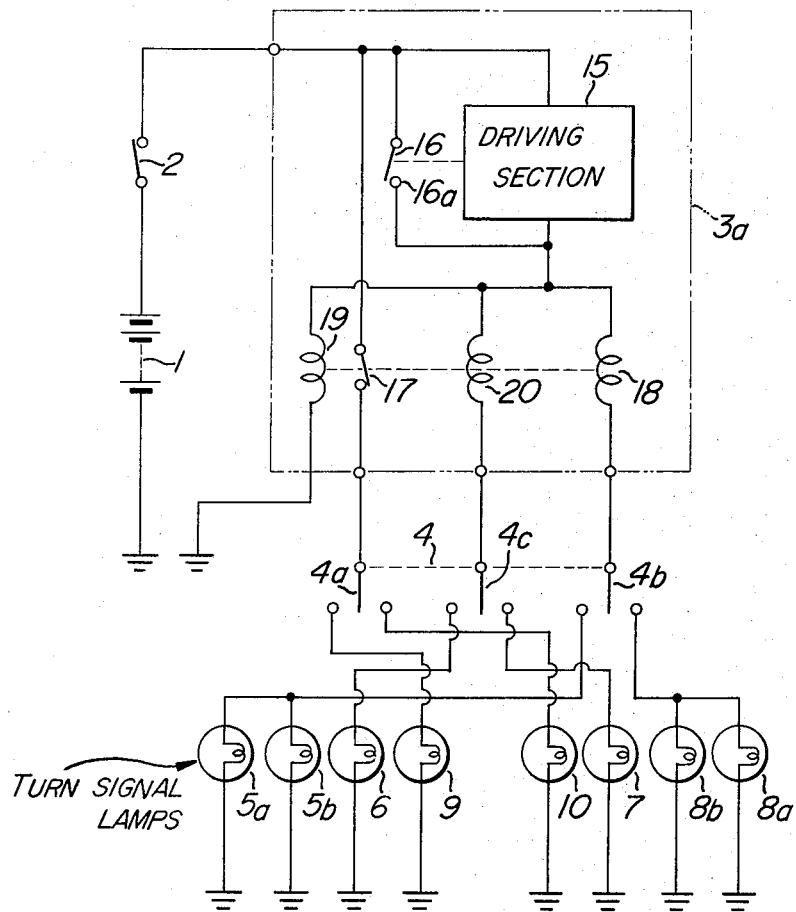
FIG. 7 is an electrical circuit diagram showing another embodiment of the invention.

Another embodiment of the present invention which is shown in FIG. 7 is applied to the direction indicating apparatus with its small-capacity turn signal lamps 6 and 7 mounted on the front sides of an automobile. In addition to the current coil 18 used to detect current in the left and right turn signal lamps 5a, 5b, 8a and 8b, the current coil is provided for detecting the current in the small-capacity turn signal lamps 6 and 7. Also, the turn signal switch 4 is provided with a switch 4c for switching between the turn signal lamps 6 and 7. The current coils 18 and 20 are wound in the same direction so that magnetomotive force generated by them is in phase with each other. The reason why the two current coils 18 and 20 are employed in the present embodiment is to cause the total magnetomotive force of the current coils 18 and 20 to be reduced equally in the event of disconnection of either the large-capacity turn signal lamps 5a and 5b or the small-capacity turn signal lamps 6 and 7. For example, it is intended that, regardless of which is disconnected, one of the left turn signal lamps 5a and 5b or the small-capacity turn signal lamp 6, the total magnetomotive force of the current coils 18 and 20 is reduced by one third. This makes it possible to detect the disconnection of any turn signal lamp, irrespective of the magnitude of capacity of a plurality of turn signal lamps with different capacities. The current coils 18 and 20 employed in the present embodiment generate magnetomotive force in the same phase, and therefore they may be regarded as a single coil electromagnetically. Their relationship with the voltage coil 19 is quite the same as when a single current coil is employed as shown in FIG. 2, and its explanation will be omitted here.

Figure 8:
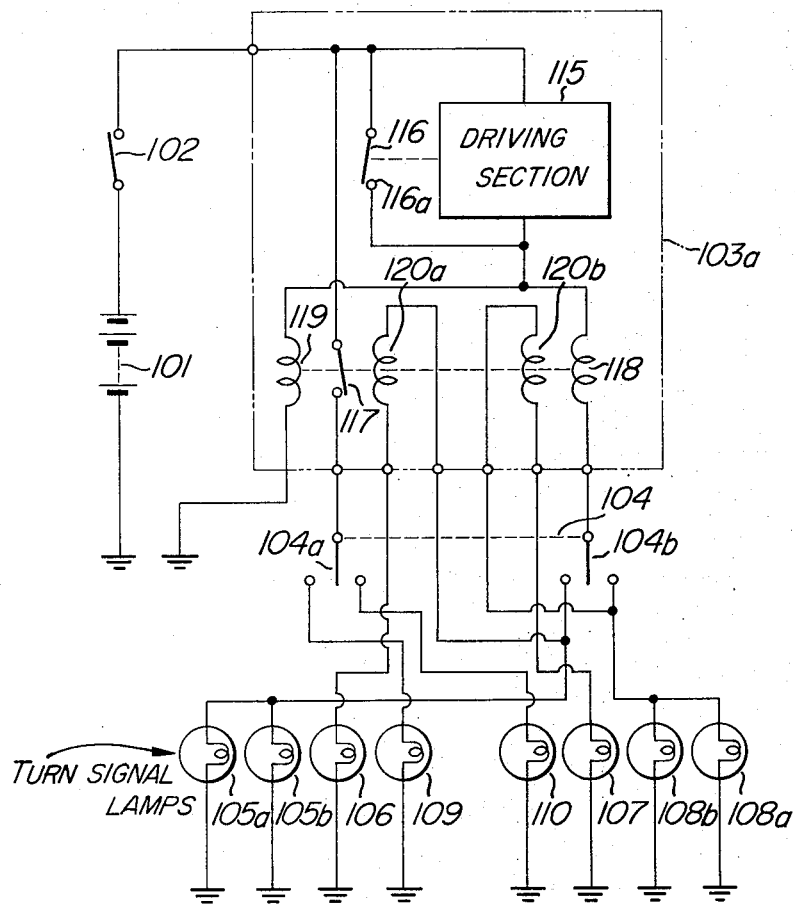
FIG. 8 is an electrical circuit diagram showing another embodiment of the flashing direction indicating apparatus according to the present invention.

Explanation will be made now of the present invention with reference to the embodiment shown in FIG. 8. The reference numeral 101 shows a battery mounted on the automobile. Numeral 102 shows a power switch, numeral 103a a flashing device according to the invention, and numeral 104 a turn signal switch which comprises switching elements 104a and 104b interlocked with each other. Numerals 105a, 105b and 106; 108a, 108b and 107 show left and right turn signal lamps respectively, the lamps 105a and 108a being located on the front and the rear of the automobile respectively. The turn signal lamps 106 and 107 which are attached to the sides of the automobile are smaller in capacity than the turn signal lamps 105a, 105b, 108a and 108b. Numerals 109 and 110 show left and right turn signal lamps respectively which are located on the control board inside the automobile. The left and right turn signal lamps 109 and 110 are not connected in parallel with the left and right turn signal lamps 105a, 105b and 106; 108a, 108b and 107, but constitute an independent circuit. The flashing device 103a comprises a normally-open contact including the movable contact element 116 and the fixed contact element 116a, a driving section 115 for interrupting the action of the movable contact element 116 at regular intervals, current coils 118, 120a and 120b in series with the turn signal lamps 105a, 105b and 106; 108a 108b and 107, a voltage coil 119 wound in the phase opposite to that of the current coils 118, 120a and 120b for generating a small magnetomotive force, and a normally-closed contact 117 which is driven by the combined magnetomotive force of the coils 118, 120a, 120b and 119.

The current coil 118 is connected to the power source side of the switching element 104b of the turn signal switch 104, so that the currents in the large-capacity left and right turn signal lamps 105a, 105b, 108a and 108b are detected at the same time. On the other hand, the current coils 120a and 120b are connected in series with the small-capacity left and right turn signal lamps 106 and 107, so that currents in the left and right turn signal lamps 106 and 107 are detected independently. The series circuit consisting of the small-capacity left and right turn signal lamps 106 and 107 and the current coils 120a and 120b is connected in parallel with the large-capacity left and right turn signal lamps 105a, 105b, 108a and 108b on the turn signal lamp side of the switching element 104b of the turn signal switch 104. The current coils 118, 120a and 120b are wound in the same direction so as to generate in-phase magnetomotive force. The reason why the three current coils 118, 120a and 120b are employed is to cause an equal reduction in the combined magnetomotive force of the current coils 118 and 120a or 120b at the time of disconnection of either the large-capacity turn signal lamps 105a, 105b, 108a and 108b or the small-capacity turn signal lamps 106 and 107. For example, it is intended that the combined magnetomotive force of the current coils 118 and 120a is reduced by one third regardless of the disconnection of one of the turn signal lamps 105a and 105b or the small-capacity turn signal lamp 106. In this way, the disconnection of any turn signal lamp is detected in the same manner even when a plurality of turn signal lamps of different capacities are employed. The three current coils 118, 120a and 120b employed in the present embodiment generate in-phase magnetomotive force. Also, the current coils 120a and 120b are used independently depending on the left or right turn indicating action and therefore may be considered as a single coil electromagnetically. The current coils 118, 120a and 120b, voltage coil 119 and the normally-closed contact 117 make up a disconnection detecting relay circuit. The interrupted driving section 115 is of the voltage type and constructed such that its frequency of interruptions is not affected by the load current, which may be replaced by any of the well-known capacitor type, mercury type, heating wire type and electromagnetic heating wire type. An example of the capacitor type which is shown in FIG. 3 comprises a pair of voltage coils 15a and 15b and the capacitor 15c. The resistance value of the voltage coils 15a and 15b is set at a sufficiently high level compared with that of the turn signal lamps.

The operation of the apparatus according to the invention with the above-described construction is identical with that of the first embodiment shown in FIG. 2. Although the first embodiment uses a single current coil, the embodiment described in the preceding paragraph includes the two current coils 118 and 120.

In spite of the above description which refers to the use of only three turn signal lamps, the disconnection of one out of four or more turn signal lamps may be made possible by lessening the ratio of the magnetomotive force generated by the current coils 118 and 120a or 120b to that generated by the voltage coil 119, which results in more effective compensation for voltage variations by means of the magnetomotive force of the opposite phase generated in the voltage coil 119.

It is apparent from the above description that the apparatus according to the present invention employs the current coils 120a and 120b in series with the small-capacity left and right turn signal lamps 106 and 107 respectively and that the series circuit consisting of the turn signal lamps 106 and 107 and the current coils 120a and 120b is connected across the large-capacity left and right turn signal lamps 105a, 105b and 108a, 108b respectively. As a consequence, it is possible to detect the disconnection of the small-capacity left and right turn signal lamps at the same time. Also, the turn signal switch 104 may be simplified in construction, consisting of two circuits.

The turn signal switch 4, which is provided with the switch 4c for switching between the small-capacity turn signal lamps 6 and 7, as shown in FIG. 7, and in which the switch 4c is connected in series with the current coil 20 to detect the disconnection of the left and right small-capacity turn signal lamps 106 and 107, requires a complicated construction of three circuits. Particularly, this holds true when a direction indicating apparatus acts also as a hazard warning signal device which gives a hazard warning signal by flashing all the turn signal lamps at the same time.

Figure 9:
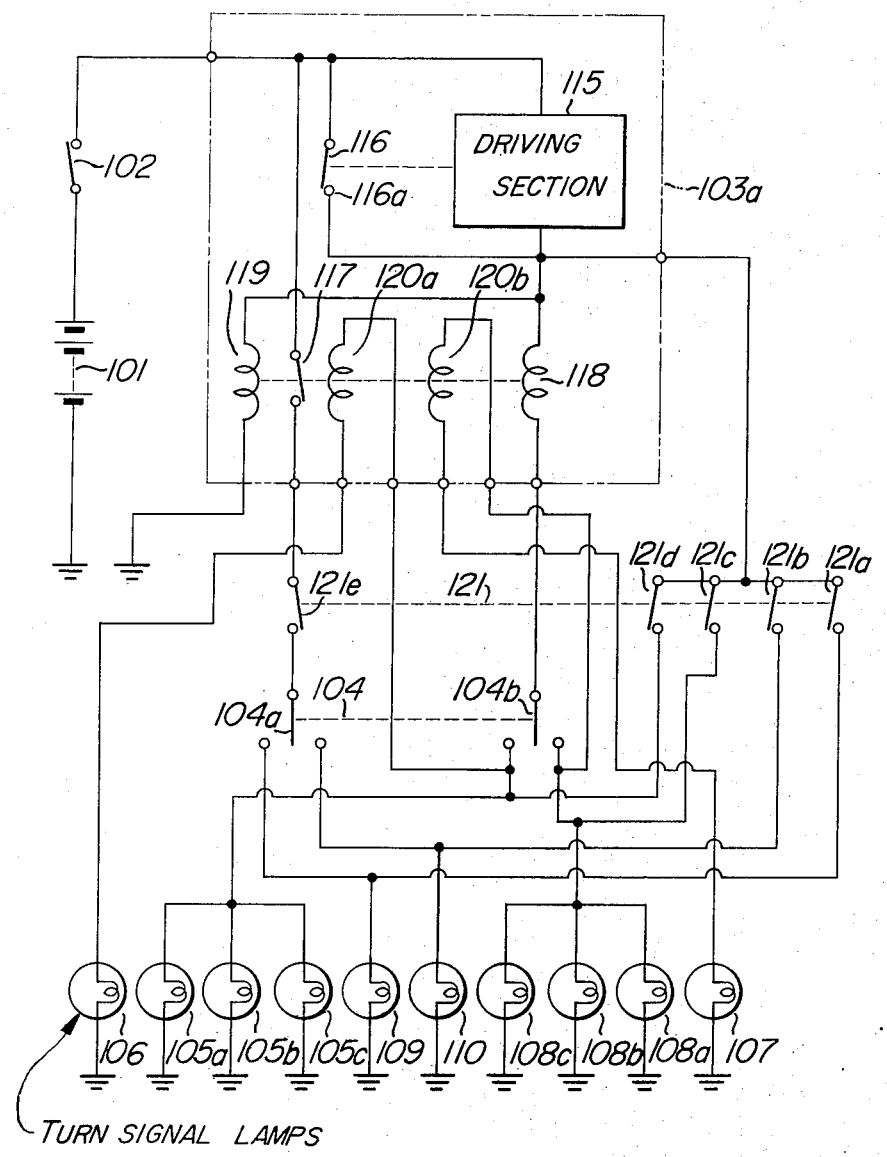
FIGS. 9 and 10 are electrical circuit diagrams showing different forms of still another embodiment of the invention.

The apparatus according to the present invention, by contrast, enables the simplification of the construction of a hazard warning signal switch, as shown in FIG. 9 which illustrates an embodiment of the invention as it is applied to a direction indicating apparatus doubling as a hazard warning signal device. In the figure, the reference numeral 121 shows a hazard warning signal switch which comprises switch elements 121a, 121b, 121c, 121d and 121e, the switch elements 121a, 121b, 121c and 121d connecting all the left and right turn signal lamps and the direction indicator lamps directly to the parallel circuit consisting of the intermittent driving section 115 and contacts 116 and 116a. The switch 121e acts to open the flash indicating switch element 104a of the turn signal switch 4 in order to prevent the direction indicator lamps 109 and 110 from being left turned on when both the hazard warning signal switch 121 and the turn signal 104 are closed at the same time. As will be apparent from FIG. 9, the apparatus according to the invention may employ a hazard warning signal switch 121 of the five-pole single-throw type, while the circuit of FIG. 7 requires a hazard warning signal switch of the seven-pole single-throw type, resulting in complicated construction.

In the embodiment of FIG. 9 which is provided with the three large-capacity turn signal lamps 105a, 105b and 105c; 108a, 108b and 108c respectively on the left and right sides of the automobile, the direction indicator lamps 109 and 110 are such that operations to indicate the flashing of the turn signal lamps are performed for the indication of both the direction and hazard. Instead of this construction, a separate hazard warning signal lamp may be provided to simplify the hazard warning signal switch further.

Figure 10:
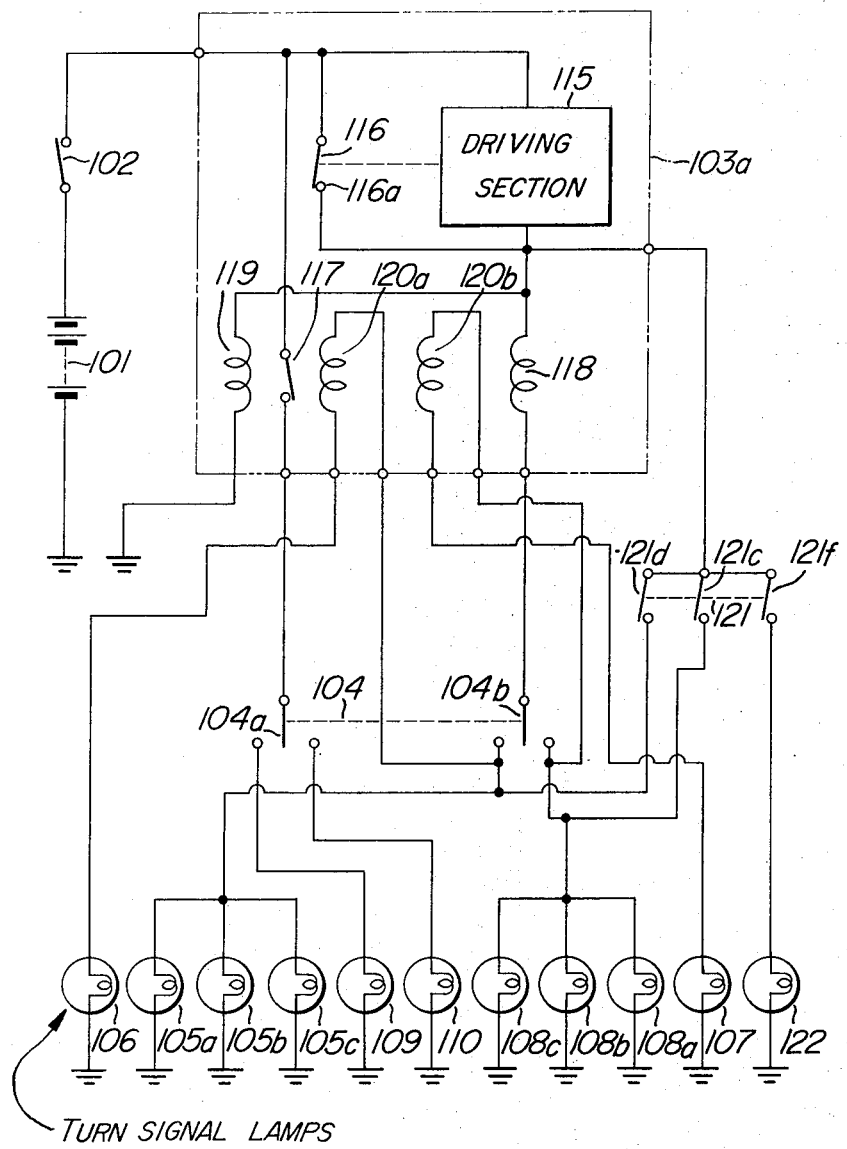

An embodiment of the invention involving a separate hazard warning signal lamp 122 is illustrated in FIG. 10, in which a simpler switch of the three-pole single-throw type is employed as a hazard warning signal switch 121.

I claim:

1. A flashing direction indicating apparatus for an automobile including a power supply and comprising a plurality of right and left turn signal lamps, left and right direction indicator lamps for providing indication to the driver of operability of the respective left and right turn signal lamps, an intermittent driving section whose frequency of interruption is not affected by variations in load current due to the possible burn out of any turn signal lamp, a turn signal switch operable to select a right side or a left side and having a turn signal lamp set of contacts and a direction indicator lamp set of contacts, each of said contact sets comprising right and left side stationary contacts and a movable contact selectively operable to contact either said right or left side stationary contacts, said movable contacts of said turn signal set of contacts and said direction indicator lamp set of contacts being coupled for simultaneous actuation, said plurality of right and left turn signal lamps being respectively connected to said right and left side stationary contacts of said turn signal lamp set of contacts and said right and left direction indicator lamps being respectively connected to said right and left side stationary contacts of said direction indicator lamp set of contacts, a normally-open contact which is closed and opened by and connected in parallel with said intermittent driving section to form a parallel circuit, a current coil, said current coil and said parallel circuit being connected in series between the power supply and said movable contact of said turn signal lamp set of contacts, a voltage coil wound in the phase opposite to that of said current coil for generating smaller magnetomotive force than said current coil, said voltage coil being connected in parallel with said current coils and through said turn signal set of contacts and said plurality of turn signal lamps, a contact driven from its normally closed state at the same frequency as the driving section by the combined magnetomotive force of said current coil and said voltage coil, said movable contact of said direction indicator lamp set of contacts being coupled through said contact to the power source so that one of the right and left direction indicator lamps is flashed in accordance with switching of said contact from its normally closed state, said coils being so wound that the combined magnetomotive force is insufficient to drive said contact from its normally closed state when one or more of the turn signal lamps of a selected side are inoperative thereby indicating a malfunction in the turn signal circuit by maintaining the direction indicator lamp corresponding to the selected side continuously lighted.

2. A flashing direction indicating apparatus for a car comprising a plurality of both large-capacity respective left and right turn signal lamps and small-capacity respective left and right turn signal lamps, a power supply, a right and left turn indication lamp for providing indication to the driver that the respective turn signal lamps are operative, an intermittent driving section whose frequency of interruption is not affected by the magnitude of a load current and which is connected to said power supply, a normally-open contact which is closed and opened by and connected in parallel with said intermittent driving section, a turn signal switch operated by the driver for activating the large and small-capacity respective left or right turn signal lamps, said turn signal switch having a turn signal lamp set of contacts and a direction indicator lamp set of contacts, each of said contact sets comprising right and left side stationary contacts and a movable contact selectively operable to contact either said right or left side stationary contacts, said movable contacts of said turn signal set of contacts and said direction indicator lamp set of contacts being coupled for simultaneous actuation, a first current coil connected between said intermittent driving section and said movable contact of said turn signal lamp set of contacts, side of said turn signal switch for detecting the currents flowing through said turn signal switch when actuated to the large-capacity left or the large-capacity right turn second and third current coils connected between the small-capacity left and right turn signal lamps respectively and the left and right turn signal lamp stationary contacts, said large-capacity left and right turn signal lamps connected directly to the respective stationary contacts of the turn signal lamp set of contacts, said first, second and third current coils being cumulatively wound to generate in-phase magnetomotive force, a voltage coil wound in the phase opposite to that of said first, second and third current coils for generating smaller magnetomotive force than the total magnetomotive force of said current coils, said voltage coil being connected in parallel with said first current coil, said turn signal lamp set of contacts, and said plurality of turn signal lamps, a contact driven from its normal closed state by the combined magnetomotive force of said plurality of current coils and said voltage coil, said movable contact of said direction indicator lamp set of contacts being coupled through said contact to the power source so that one of said right and left direction indicator lamps is flashed in accordance with the changing of said contact from its normal state so that when the combined magnetomotive force drops below a selected value indicative of a malfunction or burn out of one or more of the turn signal lamps the contact is not driven from its normal closed state and the direction indicator lamp corresponding to the selected left or right turn signal lamps is not flashed thereby indicating said malfunction to the driver.

* * * * *